(12) United States Patent
Chen

(10) Patent No.: US 6,980,334 B2
(45) Date of Patent: Dec. 27, 2005

(54) SCANNER WITH A SCAN-STARTING DEVICE

(75) Inventor: Michael Chen, Hsinchu (TW)

(73) Assignee: Avision Inc., Hsinchu (TW)

( * ) Notice: Subject to any disclaimer, the term of this patent is extended or adjusted under 35 U.S.C. 154(b) by 848 days.

(21) Appl. No.: 09/973,075

(22) Filed: Oct. 10, 2001

(65) Prior Publication Data

US 2002/0080423 A1    Jun. 27, 2002

(30) Foreign Application Priority Data

Dec. 6, 2000    (TW) .............................. 89221210 U

(51) Int. Cl.[7] .......................... H04N 1/04; H01L 27/00
(52) U.S. Cl. ...................... 358/497; 358/475; 358/474; 358/487; 358/483; 250/208.1
(58) Field of Search ................ 358/497, 474, 358/475, 487, 483; 250/208.1

(56) References Cited

U.S. PATENT DOCUMENTS 5,991,055 A * 11/1999 Haselby et al. ............. 358/509
6,470,099 B1 * 10/2002 Dowdy et al. .............. 382/287
6,473,206 B1 * 10/2002 Fujimoto et al. ........... 358/497

FOREIGN PATENT DOCUMENTS

| JP | 55-114070 | * 9/1980 | ............ H04N 1/10 |
| TW | 394489 | 3/1998 | |

* cited by examiner

*Primary Examiner*—Edward Coles
*Assistant Examiner*—Houshang Safaipour
(74) *Attorney, Agent, or Firm*—Rabin & Berdo, P.C.

(57) ABSTRACT

A scanner with scan-starting device comprises a housing, a carriage and a scan-starting device. The carriage is movable inside the housing whereas the scan-starting device further comprises a key section and a trigger section. Besides, the key section is situated on the housing whereas the trigger section is on the circuit board of the carriage. The trigger section generates a triggering signal to start the scanner to proceed scanning when the user presses the key section to touch the trigger section. The scanner according to the invention reduces the hardware space occupied by cables and circuit boards, therefore, lowers down manufacturing costs.

14 Claims, 5 Drawing Sheets

SCANNER WITH A SCAN-STARTING DEVICE

This application incorporates by reference Taiwanese application Serial No. 89221210, Filed Dec. 6, 2000.

BACKGROUND OF THE INVENTION

1. Field of the Invention

The invention relates in general to a scanner, and more particularly to a scanner with a scan-starting device.

2. Description of the Related Art

Along with the advance and development in technology, the integration and application of multi-media have become a trend nowadays. Multi-media means data contents of various types, for instance, text, image, voice, etc. In order to show the data in the form of multi-media, nowadays several varieties of multi-media devices used to scan images or record voices have been developed. However, an image scanner is one of the most frequently used tools in image processing.

Please refer to FIG. 1, a side elevation according to a conventional platform scanner 120. In FIG. 1, the scanner 120 comprises a housing 100 on which a glass platform 102, where documents-to-be-scanned 101 are placed, is situated, wherein a carriage 104 and a lighting device 106 are situated inside the housing 100. The lighting device 106 is situated on the carriage 104 inside which a light sensing module 107 is installed. The light sensing module 107 can be a charge coupled device (CCD) or a contact image sensor (CIS) for instance. A dragging element 108, powered by a step motor (not shown here), is used to drag the carriage 104. Besides, a linking device 110 is used to make the carriage 104 and the dragging element 108 linked. When the scanner starts to work, the dragging element 108 drags the carriage 104 and the lighting device 106 via the linking device 110. After having been reflected by the documents-to-be-scanned 101 on the glass platform 102, the light emitted by the lighting device 106 is received by the carriage 104. The carriage 104 receives the light signal and sends it to a light sensing module 107 where the light signal is converted into an electric signal and then sent to the processing circuit of a circuit board 112 (not shown here) situated on the carriage 104. The processing circuit then sends the processed electric signal to a computer (not shown here) via a cable 114 followed by a universal series bus (USB) port 116.

When the scanner 120 has finished scanning, the carriage 104 will be driven back to the home position by the step motor, waiting for next scanning. If the scanner 120 has to wait long for the next scanning, the scanner 120 will automatically enter into suspension status, which not only saves power but also extends the scanner's lifespan. After entering into suspension status, the scanner 120 needs to be waked up using a scan-starting device 118 situated on a panel 117 of the housing 100 to proceed scanning. The scan-starting device 118 is linked to the USB port 116 via the cable 119.

Please refer to FIG. 2, a top view of the scanner 120 in FIG. 1. In FIG. 2, the scan-starting device 118 comprises a circuit board 202 and a key 204. The circuit board 202 situated on the inner-surface of the panel 117 is linked to the USB port 116 via the cable 119. Furthermore, the key 204 is situated on the outer edge of the panel 117.

If the user wants to wake up the scanner 120, which is in suspension status, he or she only needs to press the key 204 to touch the circuit board 202. When touched and pressed by the key 204, the circuit board 202 will generate an awakening signal, which is sent to the computer (not shown here) through the cable 119 and the USB port 116. Following this, the computer generates a starting signal, which is sent to the circuit board 112 to re-start the carriage 104 through the USB port 116 and the cable 114.

Conventionally, the scanner 120 has two cables and two circuit boards, occupying a large part of hardware space. Besides, during the manufacturing process of scanners, a conventional scanner takes longer time to install the cables, pushing the costs up.

SUMMARY OF THE INVENTION

It is therefore an object of the invention to provide a scanner with scan-starting device, which saves the use of cables and circuit boards and therefore reduces manufacturing cost. The scanner with scan-starting device according to the invention also has the function to detect whether the carriage has returned to the home position or not.

According to the object of the invention, a scanner, comprising a casing, a carriage and a scan-starting device, is provided. The carriage installed inside the housing is movable; whereas the scan-starting device used to start the scanner comprises a key section and a trigger section. Besides, the key section is situated on the housing for the user to press, while the trigger section is situated on the carriage to receive the triggering coming from the key section to start the scanner.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENTS

[Preferred Embodiment One]

Figure 1:
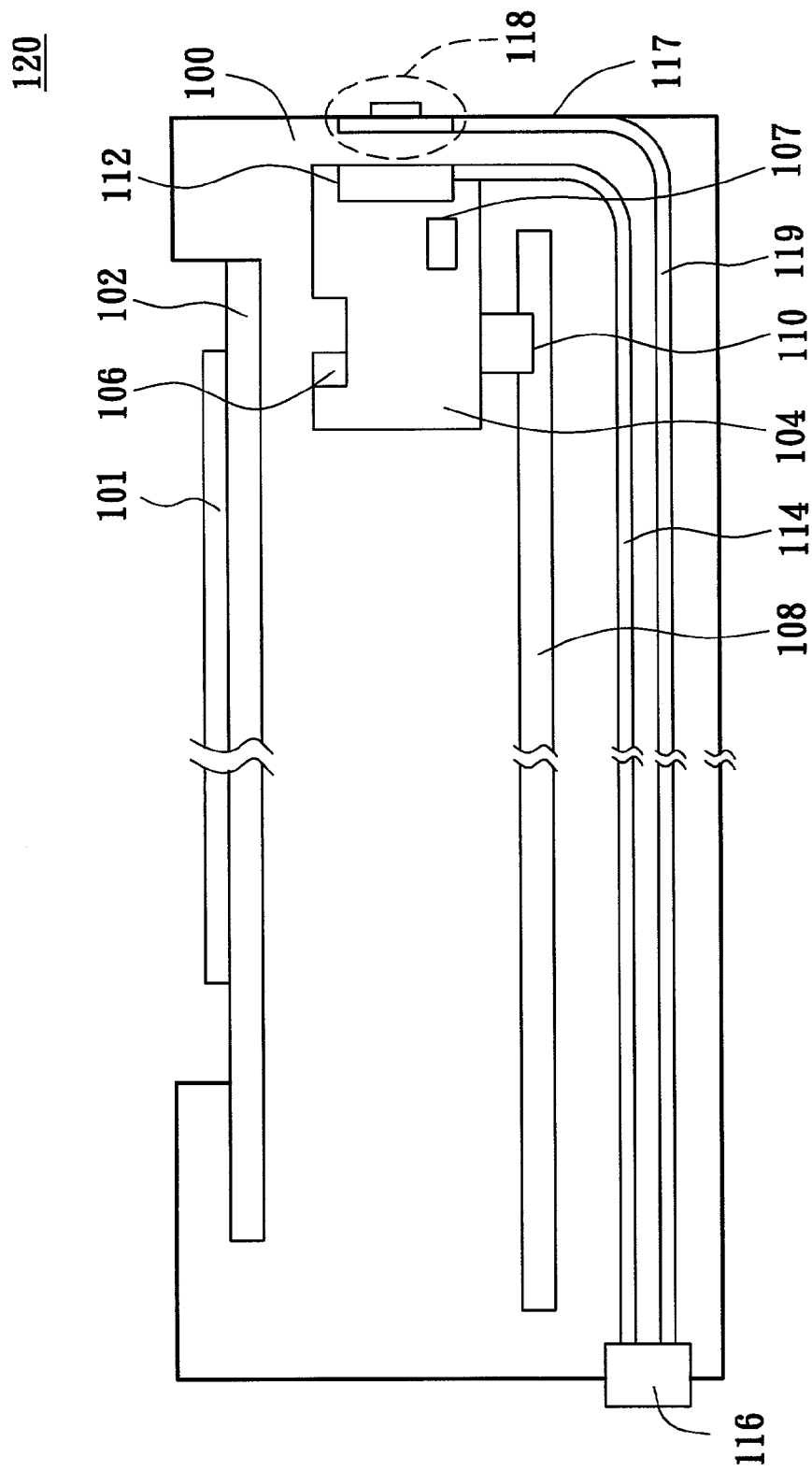
FIG. 1 shows a side elevation according to a conventional platform scanner.
Figure 2:
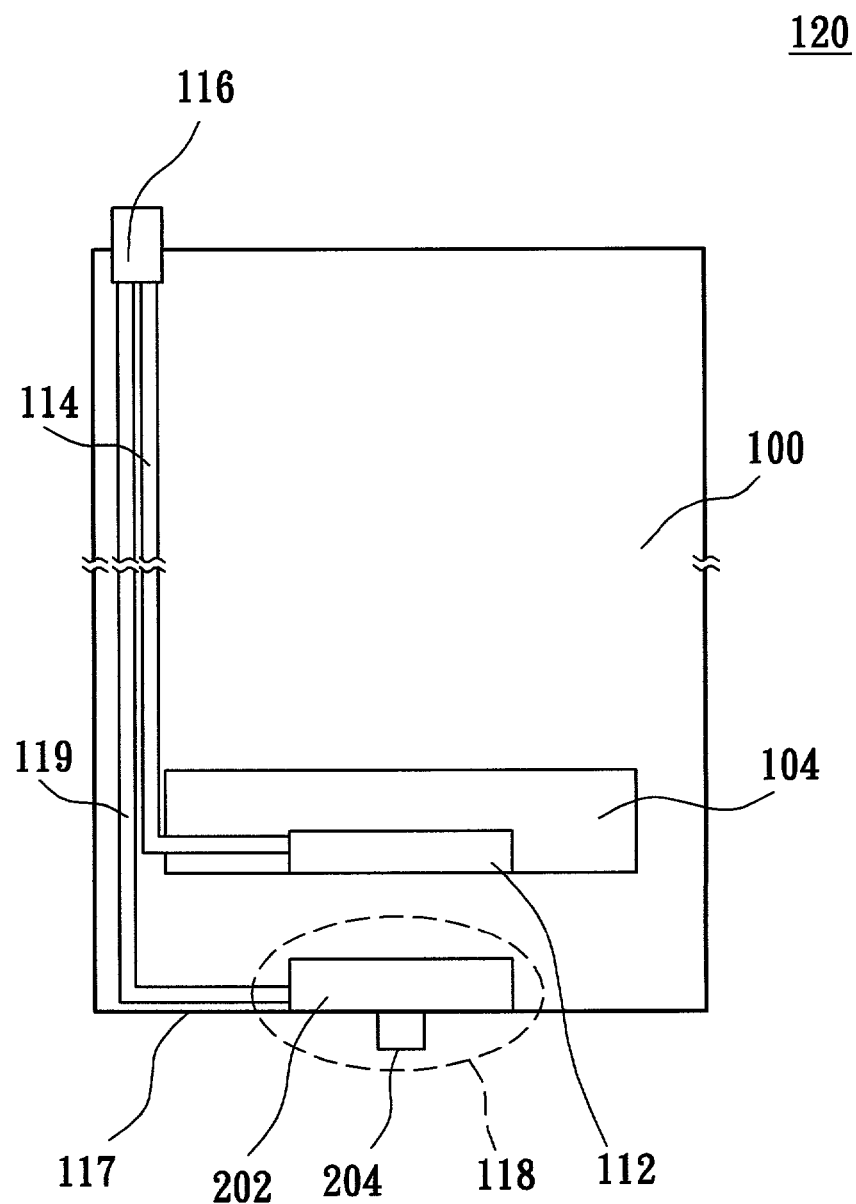
FIG. 2 shows a top view of the scanner 120 in FIG. 1.
Figure 3A:
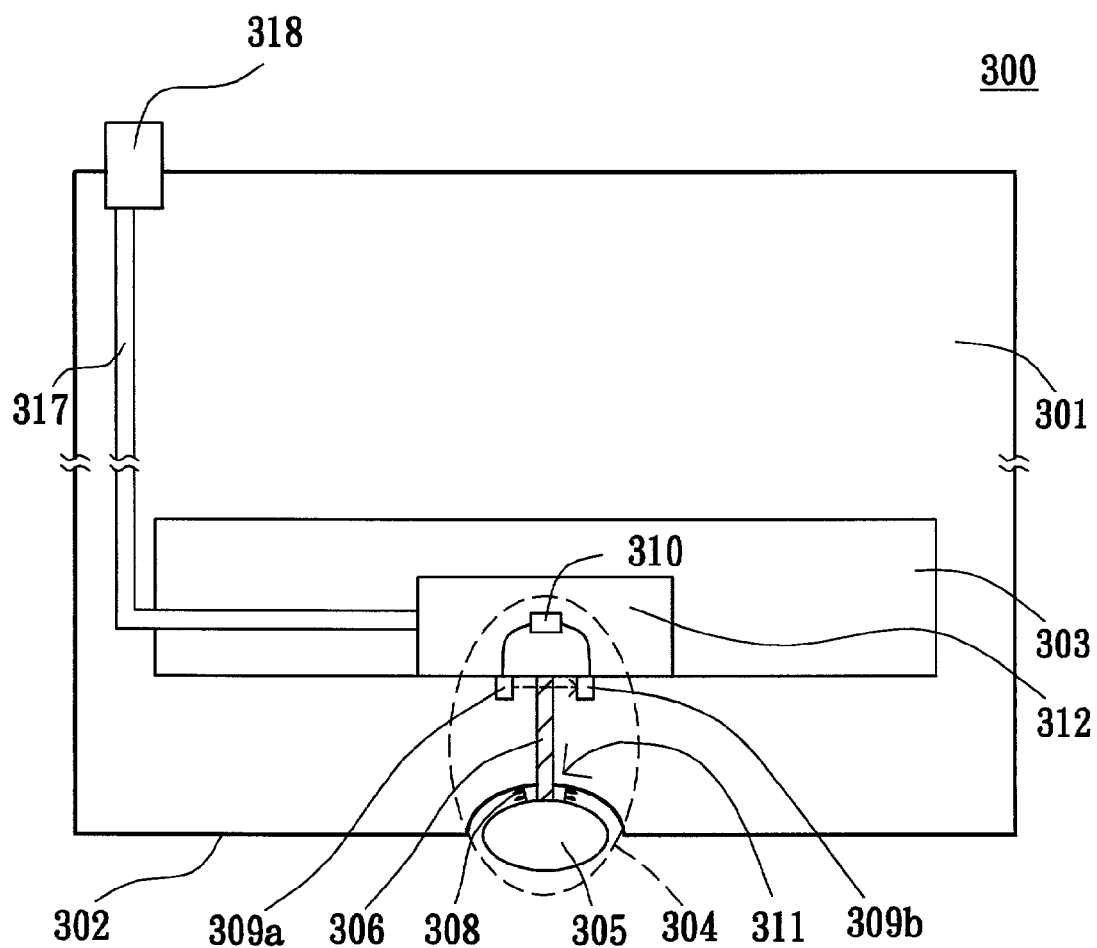
FIG. 3A shows a top view of a scanner with scan-starting device according to a preferred embodiment of the invention.

Please refer to FIG. 3A, a top view of a scanner 300 with a scan-starting device 304 according to a preferred embodiment of the invention. In FIG. 3A, the scan-starting device 304 is installed on a panel 302, which is situated on a housing 301, and on a carriage 303 (as enclosed within the dashed line), wherein the scan-starting device 304 comprises a key 305, a plate 306, an elasticity device 308, a sensor emitter, a sensor receiver, and a control circuit 310. Among so many different varieties of sensors, an infrared sensor is used in this preferred embodiment as an example. That is, the sensor emitter is an infrared sensor emitter 309a for instance, while the sensor receiver is infrared sensor receiver 309b for instance. The key 305 is situated on the panel 302 of the housing 301, while the plate 306, passing through an opening 311 of the panel 302, joins up with the key 305 to form a unity. The plate 306 is movable back and forth inside the panel 302. Besides, the elasticity device 308, with its one end being fixed to the outer edge of the panel 302 and another end to the key 305, enables the key 305 as well as the plate 306 to return to their home positions after the user has pressed the key 305. Thus, the plate 306 is able to move back and forth by means of the user's exercising force and the function of the elasticity device 308.

The invention particularly installs the infrared sensor emitter 309a and the infrared sensor receiver 309b on the circuit board 312 of the carriage 303. The infrared sensor receiver 309b receives the infrared emitted by the infrared sensor emitter 309a when no obstacle exists between the infrared sensor emitter 309a and the infrared sensor receiver 309b (as illustrated by the dashed-line arrow in FIG. 3A). Having received infrared, the infrared sensor receiver 309b generates a triggering signal and sends it to the control circuit 310 of the circuit board 312. The control circuit 310 starts the carriage 303 to proceed scanning.

Figure 3B:
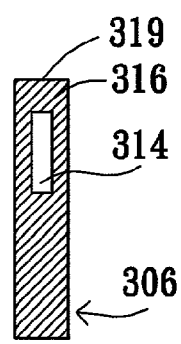
FIG. 3B shows a side elevation of the plate in FIG. 3A.

Please also refer to FIG. 3B, a side elevation of the plate in FIG. 3A. In FIG. 3B, the plate 306 has a hole, a square hole 314 for instance. When the user would like to wake up the scanner 300, which is in suspension status, he or she simply needs to press the key 305 into the housing 301, and the key 305 will carry the plate 306 to move towards the carriage 303. That is, the plate 306 moves between the infrared sensor emitter 309a and infrared sensor receiver 309b. The infrared sensor emitter 309a keeps emitting infrared. The carriage 303 is at the home position when the scanner is in suspension status. In the meanwhile, the infrared sensor receiver 309b cannot receive infrared, for it is blocked by a plate's solid section 316.

When the user presses the key 305, the square hole 314 will move to a position between the infrared sensor emitter 309a and the infrared sensor receiver 309b, allowing the infrared sensor receiver 309b to receive infrared. The infrared sensor receiver 309b will generate a triggering signal in the split second when the infrared sensor receiver 309b changes its status from being unable to receive infrared to being able to receive it. The triggering signal is sent to the control circuit 301 where the triggering signal is sent to the computer (not shown here) through the cable 317 followed by a bus port such as the universal series bus (USB) port 318. The computer generates a starting signal to be sent back to the control circuit 310 to start the carriage 303 through the USB port 318 and the cable 317. According to the aforementioned detecting methods, it would become clear whether the user has pressed the key 305 to start the scanner 300 or not.

In addition to being able to start the scanning function of the scanner 300, the scan-starting device 304 according to the invention is further equipped with the detecting function of checking whether the carriage 303 is back at the home position or not. The detecting method is disclosed hereinafter. Suppose the plate's front edge 319 should correspond to the home position under normal status if no force is exercised on the plate and the elasticity device is not compressed. The carriage 303 will return to its home position when it has finished scanning. Please refer to 3A, the carriage 303, on its way to return to the home position, moves towards the panel 302, carrying along with it the infrared sensor emitter 309a and infrared sensor receiver 309b. When the carriage 303 has returned to the home position, with the plate's solid section 316 being inserted between the infrared sensor emitter 309a and infrared sensor receiver 309b the infrared sensor receiver 309b changes its status from infrared receiving to non infrared receiving. That is, the infrared sensor receiver 309b cannot receive the infrared emitted by the infrared sensor emitter 309a. Meanwhile, the infrared sensor receiver 309b generates a halt-triggering signal. On receiving the halt-triggering signal, the control circuit 310 brings the carriage 303 back to the home position and halt it.

[Preferred Embodiment Two]

Figure 4:
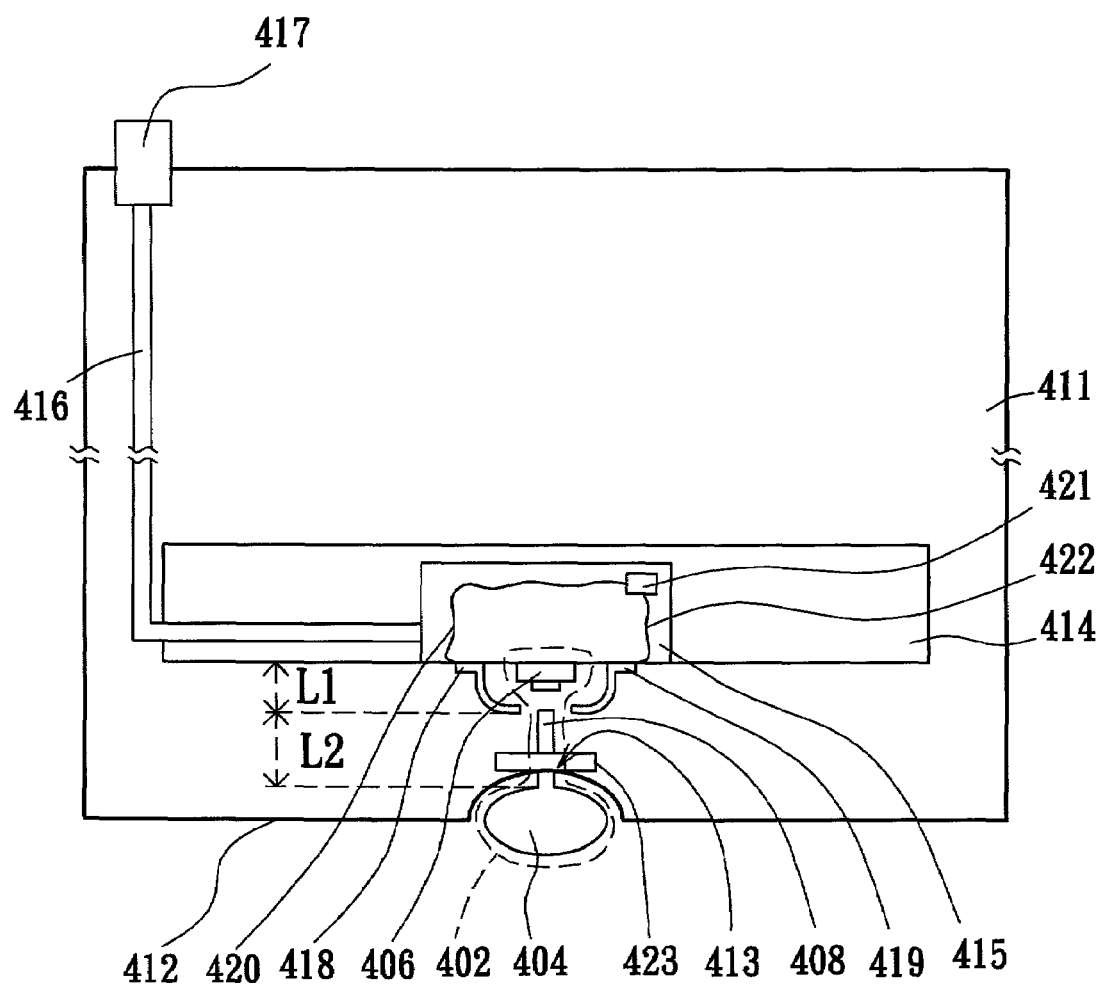
FIG. 4 shows a top view of a scanner with scan-starting device according to another preferred embodiment of the invention.

Please refer to FIG. 4, a top view of a scanner 400 with scan-starting device 402 according to another preferred embodiment of the invention. In FIG. 4, the scan-starting device 402 (as enclosed within the dashed line) comprises a key 404 and a start-triggering device 406. The key 404, being situated on a panel 412 of a housing 411, has a rod section 408 passing through an opening 413 on the panel 412, allowing the key 404 to move across the panel 412. The start-triggering device 406 is situated in a circuit board 415 of a carriage 414. When the user presses the key 404, its rod section 408 will touch the start-triggering device 406, hence the start-triggering device 406 will be started to generate a touch signal which will be sent to a circuit board 415 to start the scanner 400 to proceed scanning.

If the user would like to wake up the scanner 400 from suspension status, he or she merely needs to press the key 404 into the housing 411 to trigger the start-triggering switch 406. Suppose the force exercised on the start-triggering switch 406 must exceed a fixed value in order to trigger off the start-triggering switch 406. That is, the start-triggering switch 406 is triggered off as long as the force the user exercised on the key 404 exceeds the fixed value. Since the carriage 414 is restricted by the damping capacity of the step motor (not shown here), the carriage 414 will not move when the user exercises his or her force on the start-triggering device 406 via the key 404. The start-triggering device 406, when touched by the key 404, generates a touch signal and sends it to the circuit board 415 where the touch signal will sent to the computer (not shown here) through a cable 416 followed by a USB port, a USB port 417 for instance. The computer will generate a starting signal to start the scanner 400 when the starting signal arrives at the circuit board 415 through the USB port 417 and the cable 416.

In addition to being used to start the scanning function of the scanner 400, the scan-starting device 402 according to the invention is further equipped with the detecting function of checking whether the carriage 414 is back at the home position or not. The detecting method is disclosed hereinafter. The carriage 414 returns to its home position after having finished scanning. Please refer to FIG. 4. Both conductors 418 and conductor 419 are situated in the circuit board 415, wherein the conductor 418 is linked to the home position suspending circuit 421 on the circuit board 415 via a conducting wire 420, whereas the conductor 419 is linked to the home position suspending circuit 421 on the circuit board 415 via a conducting wire 422. The longitudinal length for both the conductor 418 and 419 is L1, while the length for the rod section 408 of the key 404 is L2. L2 is larger than L1 and the length of L1 corresponds to the home position of the carriage 414. In preferred embodiment two, arc-shaped conductors 418 and 419 are used as an example. If the invention is to be implemented, the conductors 418 and 419 can be of any shapes so long as they can touch a conductor 423 situated on the inner-surface of the panel 412.

When the carriage 414 starts to move towards the panel 412, the carriage 414 will carry the conductors 418 and 419 along with it to do the same. When the carriage 414 arrives at the home position, the conductors 418 and 419 will contact the conducting wire 423. As a consequence, a channel is formed connecting the conductors 418, 419 and 423, the conducting wires 420 and 422, and the home position suspending circuit 421. When the channel is formed, the home position suspending circuit 421 will generate a channel signal to be sent to the circuit board 415 to bring the carriage 414 to the home position and halts it. Thus the function to detect whether the carriage 414 is back at the home position is finished.

On the other side, when the carriage 414 moves towards the panel 412, the start-triggering switch 406 will do the same along with the carriage 414. Before the conductors 418 and 419 touch the conductor 423, the start-triggering switch 406 touches the rod section 408 of the key 404 first. During the process when the carriage 414 is moving towards the panel 412, the start-triggering switch 406 pushes the rod section 408 of the key 404 outwardly of the housing 411 so that the key 404 will restore to its previous status.

The start-triggering switch 406 is not triggered because the force that the carriage 414 exercises to push the rod section 408 of the key 404 is smaller than the abovementioned fixed value. However, the carriage 414 keeps pushing the key 404 outwardly of the housing 411 till the conductors 418 and 419 touch the conductor 423.

To summarize, the scan-starting device according to the invention comprises a key section and a trigger section. In terms of embodiment one, the key section comprises a key 305 and a plate 306; whereas the trigger section comprises an infrared sensor emitter 309*a* and an infrared sensor receiver 309*b*. In terms of embodiment two, the key section comprises a key 404; whereas the trigger section comprises a start-triggering switch 406.

Although to wake up the scanner to proceed scanning from suspension status is used as an example in the invention, this does not limit the invention. When the carriage is in standby mode, the scanner can also be started to proceed scanning if the user presses the key section to touch the trigger section.

Figure 5:
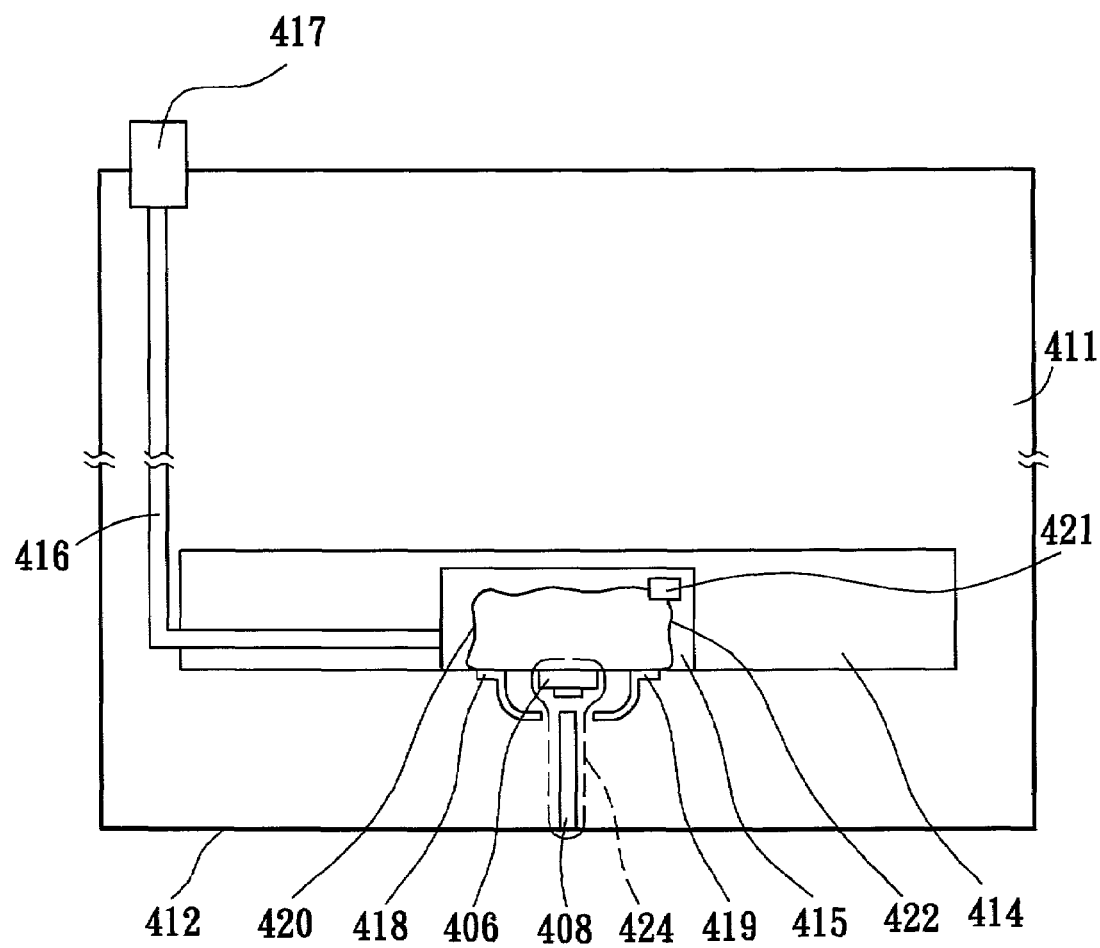
FIG. 5 shows a schematic diagram of a variation according to another preferred embodiment of the invention.

FIG. 5 shows a schematic diagram of a variation of embodiment two according to the invention. With the key 404 in FIG. 4 being firmly fixed to the housing 411 is a situation that fits an image-accessing device without a key as shown in FIG. 5. For the carriage 414 to return to the home position after having been started or having finished scanning, the carriage 414 has to keep moving together with the start-triggering switch 406, which is situated on the carriage 414, until the start-triggering switch 406 touches the rod section 408, generating a triggering signal to halt the carriage 414 such that the carriage 414 can return to the home position. Among which, the start-triggering switch 406 together with the rod section 408 are called a homing device 424 in the invention.

It is noteworthy that the scanner with scan-starting device disclosed in the invention has the advantages of reducing the number of cables used, the hardware space occupied by circuit boards, and manufacturing costs as well. Moreover, the scanner with a scan-starting device disclosed in the invention is further equipped with the function of detecting whether the carriage is back at the home position or not.

While the invention has been described by way of example and in terms of the preferred embodiment, it is to be understood that the invention is not limited to the disclosed embodiment. Therefore, the scope of protection of the invention is defined in the appended claims; and it is to be understood that invention is intended to cover various modifications and similar arrangements and procedures, and the scope of the appended claims therefore should be accorded the broadest interpretation so as to encompass all such modifications and similar arrangements and procedures.

What is claimed is:

1. A scanner, comprising:
    a housing;
    a carriage which is movable inside the housing; and
    a scan-starting device, for starting the scanner to proceed scanning, the scan-starting device comprising:
        a trigger section situated on the carriage; and
        a key section, situated on the housing, for acting on the trigger section to enable the trigger section to output a signal to start the scanner to proceed scanning, wherein the key section comprises:
            a key, which is installed on a panel of the housing; and
            an extension part, extended from the key and through an opening of the panel, for moving back and forth inside the panel to trigger the signal from the trigger section.

2. A scanner according to claim 1, wherein the key is installed on the panel of the housing via an elasticity device and the extension part has a hole.

3. A scanner according to claim 2, wherein the trigger section comprises a sensor, the sensor comprising an emitter and a receiver, installed on a circuit board of the carriage, wherein the emitter continuously emits a sensing signal.

4. A scanner according to claim 3, wherein the sensor is an infrared sensor.

5. A scanner according to claim 3, wherein the key is being suppressed to move the hole to a position between the emitter and the receiver, such that the sensing signal transmits through the hole from the emitter to the receiver and the receiver starts the scanner to proceed scanning.

6. A scanner according to claim 5, wherein when the carriage is back to a home position near the panel, the extension part is inserted between the emitter and the receiver with the hole out of the position, such that the sensing signal emitted by the emitter is blocked by the extension part and the receiver thereby generates a halt-triggering signal which brings the carriage back to the home position and halts it.

7. A scanner according to claim 2, wherein one end of the elasticity device is fixed to the outer edge of the panel while another end to the key.

8. A scanner according to claim 1, wherein the extension part is a rod section.

9. A scanner according to claim 8, wherein the carriage comprises a circuit board while the trigger section is a start-triggering switch installed on the circuit board.

10. A scanner according to claim 9, wherein a force exceeding a fixed value is exerted on the key to actuate the start-triggering switch.

11. A scanner according to claim 8, wherein the circuit board further comprises:
    a first conductor and a second conductor, which are electrically connected to a home position suspending circuit of the circuit board; and
    a third conductor, which is installed on an inner-surface of the panel and corresponds to the first and second conductors, forming a channel together with the first conductor, the second conductor, and the home position suspending circuit when the carriage returns to a home position near the panel, thereby allowing the first and the second conductors to contact the third conductor, in the meanwhile, the home position suspending circuit generates a channel signal to the circuit board to bring the carriage to the home position and halts it.

12. A scanner according to claim 11, wherein both the first and the second conductors are arc-shaped.

13. A scanner according to claim 12, wherein the longitudinal length for both the first and the second conductors is of a first length, and the key's rod section is of a second length greater than the first length.

14. A scanner, comprising:
a housing;
a carriage, which is movable inside the housing; and
a homing device, which is used to bring the carriage to a predetermined home position, the homing device comprising:
   a trigger section, which is situated on the carriage; and
   a rod section, which is situated on the housing, wherein the carriage keeps moving until the rod section touches the trigger section.

* * * * *